United States Patent
Galloway (10) Patent No.: US 7,314,669 B2
(45) Date of Patent: Jan. 1, 2008

(54) EASY PEEL FILM STRUCTURES

(75) Inventor: Deane Galloway, Appleton, WI (US)

(73) Assignee: Pechiney Emballage Flexible Europe, Rueil Malmaison (FR)

(*) Notice: Subject to any disclaimer, the term of this patent is extended or adjusted under 35 U.S.C. 154(b) by 10 days.

(21) Appl. No.: 10/359,951

(22) Filed: Feb. 5, 2003

(65) Prior Publication Data
US 2004/0151932 A1 Aug. 5, 2004

(51) Int. Cl.
*B32B 27/08* (2006.01)
*B32B 27/32* (2006.01)

(52) U.S. Cl. .............. 428/516; 428/35.7; 428/36.8; 428/346; 428/347; 428/349; 428/355 R; 428/500; 428/515; 525/221; 525/222; 525/231; 525/240; 220/359.1; 220/359.3; 215/232

(58) Field of Classification Search .............. None
See application file for complete search history.

(56) References Cited

U.S. PATENT DOCUMENTS

| | | | | |
|---|---|---|---|---|
| 3,879,492 A | * | 4/1975 | Bontinick | 523/100 |
| 4,656,068 A | * | 4/1987 | Raines | 229/123.1 |
| 4,729,476 A | * | 3/1988 | Lulham et al. | 206/484.2 |
| 4,759,984 A | * | 7/1988 | Hwo | 428/349 |
| 4,764,404 A | | 8/1988 | Genske et al. | |
| 4,784,885 A | * | 11/1988 | Carespodi | 428/36.8 |
| 4,808,662 A | * | 2/1989 | Hwo | 525/74 |
| 4,859,514 A | * | 8/1989 | Friedrich et al. | 428/36.6 |
| 4,875,587 A | * | 10/1989 | Lulham et al. | 206/484 |
| 4,894,266 A | | 1/1990 | Bauer et al. | |
| 4,937,139 A | | 6/1990 | Genske et al. | |
| 4,970,113 A | * | 11/1990 | Yamada | 428/323 |
| 5,061,532 A | * | 10/1991 | Yamada | 428/35.7 |
| 5,093,164 A | * | 3/1992 | Bauer et al. | 428/35.4 |
| 5,106,917 A | * | 4/1992 | Lee et al. | 525/229 |
| 5,137,763 A | | 8/1992 | Bauer et al. | |
| 5,160,767 A | | 11/1992 | Genske et al. | |
| 5,302,442 A | * | 4/1994 | O'Brien et al. | 428/213 |
| 5,324,555 A | * | 6/1994 | Hughart et al. | 428/34.9 |
| 5,346,735 A | * | 9/1994 | Logan et al. | 428/36.7 |
| 5,346,764 A | | 9/1994 | Kudo et al. | |
| 5,407,741 A | * | 4/1995 | Ota | 428/323 |
| 5,407,751 A | | 4/1995 | Genske et al. | |

(Continued)

FOREIGN PATENT DOCUMENTS

EP 0380145 B1 11/1997

(Continued)

*Primary Examiner*—Vivian Chen
(74) *Attorney, Agent, or Firm*—Banner & Witcoff, Ltd.

(57) ABSTRACT

The present invention relates to sealant films comprising a first sealant layer which readily and easily delaminates or peels from a second adjacent film layer. The first sealant layer and the second adjacent layer of the sealant film of the present invention comprise propylene or ethylene moieties wherein the propylene or ethylene moieties may be homopolymers or copolymers. The film structures of the present invention can be used independently, or laminated to a second film structure wherein the second film structure may comprise a single layer or multiple layers. The sealant films of the present invention can be heat sealed to a packaging component, such as a tray either as a single film structure or as a laminate comprising a second film structure. The sealant film structures of the present invention are particularly useful as retortable lidstock.

2 Claims, 2 Drawing Sheets

U.S. PATENT DOCUMENTS

| | | | |
|---|---|---|---|
| 5,478,617 A | * 12/1995 | Watanabe et al. | 428/35.2 |
| 5,500,265 A | * 3/1996 | Ambroise et al. | 428/41.3 |
| 5,558,930 A | 9/1996 | DiPoto | |
| 5,626,929 A | * 5/1997 | Stevenson | 428/35.8 |
| H1727 H | * 5/1998 | Jones et al. | 428/35.7 |
| 5,766,018 A | * 6/1998 | Terashima | 434/307 A |
| 5,773,136 A | * 6/1998 | Alder et al. | 428/317.3 |
| 5,837,369 A | * 11/1998 | Grunberger et al. | 428/349 |
| 5,919,863 A | * 7/1999 | Seppanen et al. | 525/85 |
| 5,997,968 A | * 12/1999 | Dries et al. | 428/35.7 |
| 6,224,973 B1 | * 5/2001 | Trouilhet | 428/340 |
| 6,248,380 B1 | * 6/2001 | Kocher et al. | 426/127 |
| 6,475,578 B1 | * 11/2002 | Gerrits et al. | 428/35.7 |
| 6,590,034 B2 | * 7/2003 | Wanic et al. | 525/191 |
| 6,630,237 B2 | * 10/2003 | Rivett et al. | 428/355 EN |
| 6,645,609 B2 | * 11/2003 | Sperlich et al. | 428/216 |
| 6,720,045 B2 | * 4/2004 | Kawamura et al. | 428/35.7 |
| 6,749,948 B2 | * 6/2004 | Sperlich et al. | 428/516 |
| 6,770,361 B2 | * 8/2004 | Kong | 428/354 |

FOREIGN PATENT DOCUMENTS

| | | | |
|---|---|---|---|
| WO | WO 93/17863 | * | 9/1993 |
| WO | 01/45934 A1 | | 6/2001 |

* cited by examiner

EASY PEEL FILM STRUCTURES

FIELD OF THE INVENTION

The present invention relates to improved peelable sealant film structures which are especially suitable for use as lidstock for retortable packages.

BACKGROUND OF THE INVENTION

The use of formed trays and peelable lids for those trays, has been known for some time. For example, food products such as microwaveable meals are commonly packaged in packages requiring a peelable lid. These packages are usually subjected to relatively severe processing conditions either at the point where the package is being filled and sealed or at the point where the package and its contents are to be used. In the packaging of food products, it is also desirable to provide lidstock material which will not only protect the food product from outside contaminants but is easily and readily peelable in order to provide the consumer with easy access to the product.

A particular problem is encountered in providing packaging for the severe process conditions of, for example, retort processing or the end use environments, in that there are only a limited number of packaging materials which can be used to provide the combined properties of (i) barrier functions, (ii) the ability to survive the severe processing and use conditions, (iii) safety for use in the packaging of food, and (iv) holding the package closed and containing the product.

Of special concern is providing a heat sealable film structure which forms the lid of the package, especially a retortable package, and which can be heat sealed to, for example, the peripheral flange of the tray and subsequently be removed with a moderate amount of force. The lid cannot, however, be so loosely sealed to the tray that it is inadvertently or otherwise undesirably released from the tray prior to an intentional opening of the package. Thus there is the requirement that the package seal tightly when closed but be readily openable. The closure must provide the necessary protection from the outside environment while the package is intended to be closed. The package should be capable of being opened with a moderate amount of force with a smooth and constant pulling. The removal of the lid should be smooth and steady when a constant opening force is applied, such that jerky motions or sudden releases of adhesion are not encountered.

Many sealant film structures which have utility in retort packaging are known. U.S. Pat. No. 5,407,751 is one exemplification of this art. However, while the art discloses sealant film structures useful in retort packaging, there still exists a need in retort packaging for a sealant film structure which not only meets the high demands of retort packaging but has a lower peel force.

The applicant has discovered a sealant film structure which meets the high demands of retort packaging while lowering the peel force necessary to remove said sealant film structure from the package.

SUMMARY OF THE INVENTION

According to the present invention, there is provided a multiple layer sealant film structure comprising a first sealant layer, and a second adjacent layer in direct contact with the first sealant layer, and a third polymeric layer in direct contact with the second layer, wherein the first layer is comprised of a propylene moiety, the second layer is comprised of a blend of a propylene moiety and an ethylene-$\alpha$-olefin copolymer and the third polymeric layer is comprised of a propylene moiety. The above described sealant film structure may also be laminated to a second film structure wherein the second film structure may comprise a single layer or multiple layers.

The above described sealant film structure may also comprise one or more additional layers wherein these layers may independently comprise a polymeric resin, such as propylene or ethylene either as a homopolymer or a polymer in conjunction with a copolymer; a color concentrate in a polymer base; a barrier material; and an adhesive or tie material. These enhanced sealant film structures may also be laminated to a second film structure.

While the sealant film structures of the present invention may be laminated to a second film structure, they also may be directly heat sealed to a packaging component, such as a tray.

The film structures of the present invention are particularly useful in peelable lidstock applications for retortable packaging. The film structures of the present invention will delaminate between the first sealant layer and the second adjacent layer affording a clean peel. The peel force necessary to remove the lidstock of the present invention from the packaging component is lower than expected given the high sealing temperatures and burst force requirements for retortable packaging. The peel force necessary to remove the lidstock from the packaging component (i.e., tray) is between about 6 to 8 lb. (initiation force) and between about 2.5 to 3.5 lb. (continuation force). These peel force numbers were determined using an Instron Test.

A first preferred embodiment for the multi-layer sealant film structure of the present invention is comprised of a first sealant layer, a second adjacent layer and a third polymeric layer wherein the first sealant layer is comprised of a propylene ethylene copolymer in an amount greater than about 50% by weight based on the total weight of the layer; the second adjacent layer is comprised of a blend of propylene ethylene copolymer and an ethylene $\alpha$-olefin copolymer wherein the propylene ethylene copolymer is present in an amount up to about 60% by weight based on total weight of the layer and the ethylene $\alpha$-olefin is present in an amount up to about 40% by weight based on the total weight of the layer; and the third polymeric layer is comprised of a propylene ethylene copolymer in an amount greater than about 50% by weight based on the total weight of the layer and wherein the first sealant layer is in direct contact with the second adjacent layer and the third polymeric layer is in direct contact with the second adjacent layer.

A second preferred embodiment for the multi-layer sealant film structure of the present invention is comprised of a first sealant layer, a second adjacent layer, a third polymeric layer, a fourth polymeric layer and a fifth polymeric layer wherein the first sealant layer is comprised of a propylene ethylene copolymer in an amount greater than about 50% by weight based on the total weight of the layer, the second adjacent layer is comprised of a blend of propylene ethylene copolymer and an ethylene $\alpha$-olefin copolymer wherein the propylene ethylene copolymer is present in an amount up to about 60% by weight based on the total weight of the layer and the ethylene $\alpha$-olefin is present in an amount up to about 40% by weight based on the total weight of the layer; the third polymeric layer is comprised of propylene ethylene copolymer and a color concentrate in a polymer base wherein the propylene ethylene copolymer is present in an amount up to about 84% by weight based on the total weight of the layer and the color concentrate is present in an amount up to about 16% by weight based on the total weight of the layer; the fourth layer is the same as the third layer and the fifth layer is comprised on a propylene ethylene copolymer in an amount greater than about 50% by weight based on the total weight of the layer wherein the first sealant layer is in direct contact with the second adjacent layer and the third layer is in direct contact with the second adjacent layer and the fourth layer is in direct contact with the third layer and the fifth layer is in direct contact with the fourth layer. While the second embodiment has been expressed as a five-layer structure, it could also be expressed as a four-layer structure since layers three and four are the same.

A third preferred embodiment for the multi-layer sealant film structure of the present invention is comprised of a three-layer coextruded film comprising a first sealant layer, a second adjacent layer and a third polymeric layer wherein the first sealant layer is comprised of a propylene ethylene α-olefin copolymer in an amount greater than about 50% by weight based on the total weight of the layer; the second adjacent layer is comprised of a blend of propylene ethylene copolymer and an ethylene α-olefin copolymer wherein the propylene ethylene copolymer is present in an amount up to about 60% by weight based on total weight of the layer and the ethylene α-olefin copolymer is present in an amount up to about 40% by weight based on the total weight of the layer; and the third polymeric layer is comprised of a propylene ethylene copolymer in an amount greater than about 50% by weight based on the total weight of the layer and wherein the first sealant layer is in direct contact with the second adjacent layer and the third polymeric layer is in direct contact with the second adjacent layer wherein said sealant film structure is laminated to a film structure comprising PET/adhesive/vinylidene chloride methylacrylate copolymer/adhesive/biaxial nylon/adhesive and wherein the layer comprising the adhesive adjacent the biaxial nylon is in direct contact with the third polymer layer of the sealant film structure.

A fourth preferred embodiment for the multi-layer sealant film structure of the present invention is comprised of a five-layer coextruded film comprising a first sealant layer, a second adjacent layer, a third polymeric layer, a fourth polymeric layer and a fifth polymeric layer wherein the first sealant layer is comprised of a propylene ethylene copolymer in an amount greater than about 50% by weight based on the total weight of the layer, the second adjacent layer is comprised of propylene ethylene copolymer and an ethylene α-olefin copolymer wherein the propylene ethylene copolymer is present in an amount up to about 60% by weight based on the total weight of the layer and the ethylene α-olefin is present in an amount up to about 40% by weight based on the total weight of the layer; the third polymeric layer is comprised of propylene ethylene copolymer and a color concentrate in a polymer base wherein the propylene ethylene copolymer is present in an amount up to about 84% by weight based on the total weight of the layer and the color concentrate is present in an amount up to about 16% by weight based on the total weight of the layer; the fourth layer is the same as the third layer and the fifth layer is comprised on a propylene ethylene copolymer in an amount greater than about 50% by weight based on the total weight of the layer wherein the first sealant layer is in direct contact with the second adjacent layer and the third layer is in direct contact with the second adjacent and the fourth layer is in direct contact with the third layer and the fifth layer is in direct contact with the fourth layer wherein said sealant film is laminated to a film structure comprising PET/adhesive/vinylidene chloride methylacrylate copolymer/adhesive/biaxial nylon/adhesive wherein the layer comprising the adhesive adjacent the biaxial nylon is in direct contact with the fifth polymer layer of the sealant film structure.

The sealant film structures of the present invention are designed to be laminated to a second film structure which can be further heat sealed to a packaging component, such as a tray. The film structures of the present invention are retortable and also are openable by the delamination or peeling away of the film structure of the present invention from the packaging component such as a tray. As the force is exerted to remove the film from the packaging component, the first sealant layer of the film structure of the present invention delaminates or peels away from the second adjacent layer in the area of the sealing interface. It has been found that the peel force required to delaminate or peel away the film structure of the present invention from the a packaging component is surprisingly less than expected. While the peel force has been reduced, the seal strengths and burst force requirements have not been compromised.

For retort applications, the packaging component, such as a tray are often polypropylene or polyethylene based. The first sealant layer should include a predominance of polyethylene or polypropylene to match the predominance in the tray. The second adjacent layer may comprise any of a number of compositions which adhere only to a limited extent to the composition of the first sealant layer. If the first sealant layer is predominately polypropylene, the second adjacent layer may include polyethylene or ethylene copolymers which have a limited affinity to propylene. If the first sealant is predominately polyethylene, the second adjacent layer may include polypropylene or propylene copolymers. Therefore, in the sealant film structures of the present invention, the first sealant layer comprises a polymeric material and the second adjacent layer comprises a blend of the same polymeric material as is present in the first sealant layer and an α-olefin copolymer wherein the polymer of the α-olefin copolymer moiety is different from the polymer of the first sealant layer.

By selecting the compositions of the first sealant layer and the second adjacent layer to have limited affinity to one another, the film structure will delaminate under the exertion of a predetermined amount of force. This allows for removal of the film structure from the retorted container either before or after microwave heating of the container.

DETAILED DESCRIPTION

Figure 1:
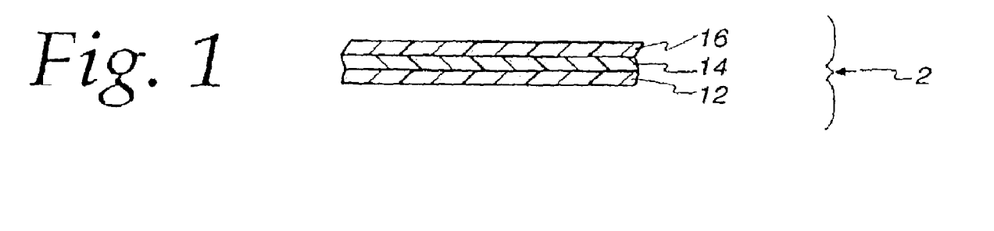
FIG. 1 shows a three-layer film structure of the present invention.

FIG. 1 shows a three layer film structure of the present invention (2) which comprises a first sealant layer (12), and second adjacent layer (14) and a polymer layer (16). The film structure (2) can be laminated to a second film structure or heat sealed to a packaging component, such as a tray.

Generally, the three layer film structure of the present invention as described in FIG. 1 is a sealant film whereby a peelable seal is created when the sealant film is heat sealed to a packaging component, such as another film structure or a rigid tray. When peeled via pull-apart forces, the first sealant layer delaminates from the second adjacent layer due to an incompatibility of film layer components between the first sealant layer (12) and the second adjacent layer (14).

For example, the first sealant layer (12) may comprise a propylene or ethylene moiety while the second adjacent layer (14) may comprise a blend of a propylene or ethylene moiety and an α-olefin, such as an ethylene α-olefin copolymer. In addition, the third polymeric layer (16) may also comprise a propylene or ethylene moiety. Although the first sealant layer (12) and the second adjacent layer (14) may readily adhere together via an extrusion process, such as coextrusion, the first sealant layer (12) and the second adjacent layer (14) delaminates when sufficient pull-apart forces are applied to a package made with the sealant film.

Figure 2:
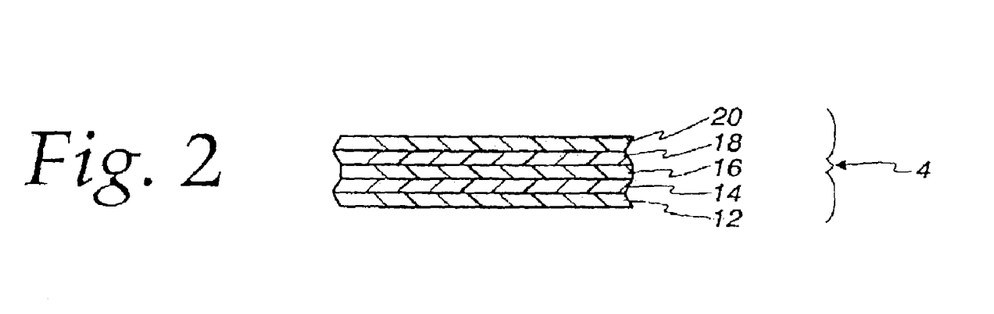
FIG. 2 shows a five-layer film structure of the present invention.

FIG. 2 shows a five layer sealant film of the present invention (4) which comprises a first sealant layer (12), a second adjacent layer (14), a third polymeric layer (16), a fourth polymeric layer (18) and a fifth polymeric layer (20). The film structure (4) can be laminated to a second film structure or heat sealed to a packaging component, such as a tray. Also in film structure (4), polymeric layers (16), (18) and (20) may further independently comprise a pigmented concentrate.

Figure 3:
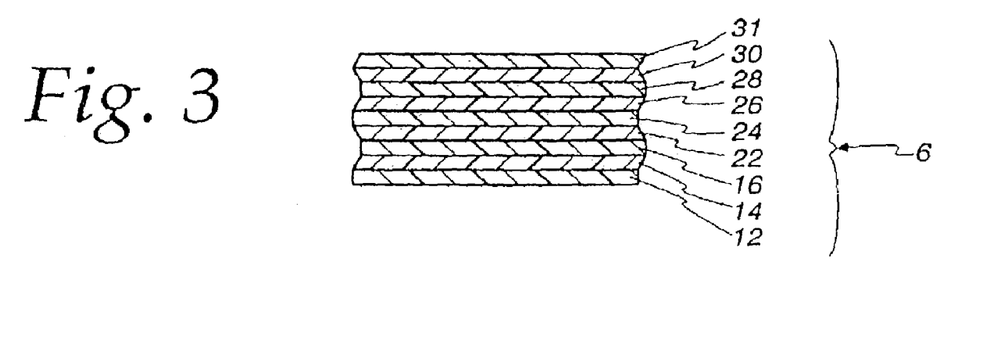
FIG. 3 shows a nine-layer film structure of the present invention.

FIG. 3 shows a nine-layer film structure (6) comprising the sealant film of FIG. 1 (layers 12, 14 and 16) and a second film structure comprising an adhesive layer (22) wherein the adhesive material can be exemplified by, but not limited to, urethane adhesives; an abuse-resistant layer (24) wherein the abuse-resistant layer material can be exemplified by, but not limited to, biaxial nylon; adhesive layer (26) wherein the adhesive material is as described before; barrier layer (28) wherein the barrier material is exemplified by, but not limited to, vinylidene chloride methylacrylate copolymer; adhesive layer (30); and heat resistance layer (31) wherein the layer material can be exemplified by, but not limited to, polyethylene terephthalate (PET).

Figure 4:
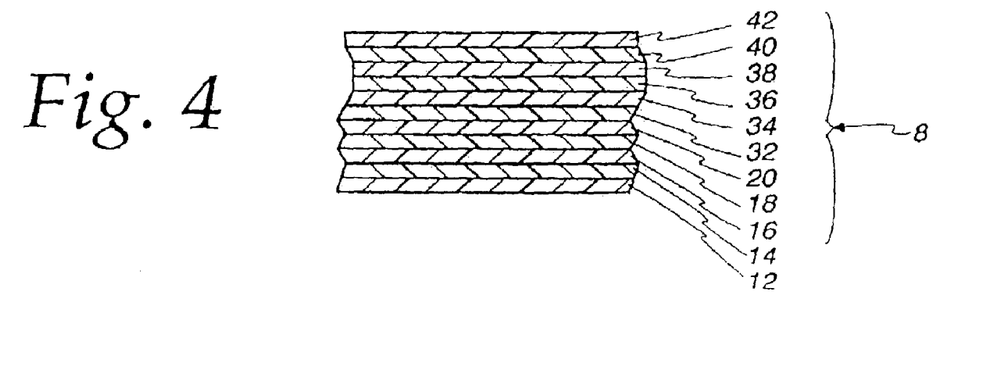
FIG. 4 shows an eleven-layer film structure of the present invention.

FIG. 4 shows an eleven-layer film structure (8) comprising the sealant film of FIG. 2 (layers 12, 14, 16, 18 and 20) and a second film structure comprising an adhesive layer (32) wherein the adhesive material can be exemplified by, but not limited to, urethane adhesives; an abuse-resistant layer (34) wherein the abuse-resistant layer material can be exemplified by, but not limited to, biaxial nylon; adhesive layer (36) wherein the adhesive material is as described before; barrier layer (38) wherein the barrier material is exemplified by, but not limited to, vinylidene chloride methylacrylate copolymer; pigmented adhesive layer (40) wherein the adhesive is urethane adhesive containing a color concentrate; and heat resistance layer (42) wherein the layer material can be exemplified by, but not limited to, polyethylene terephthalate (PET).

Figure 5:
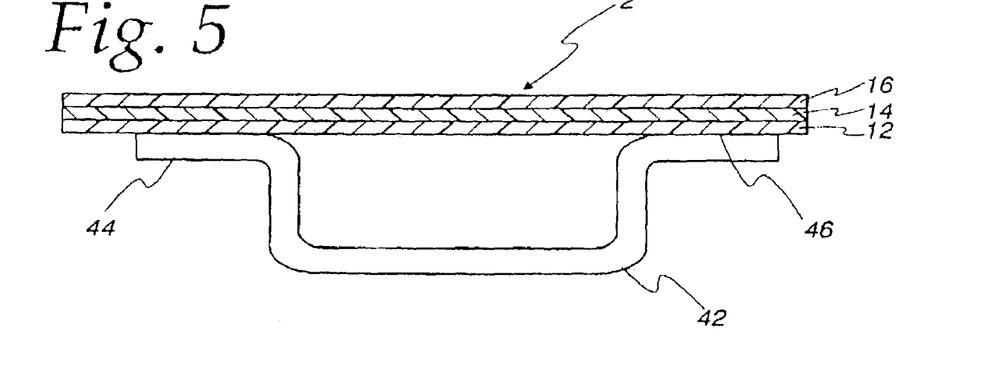
FIG. 5 shows a package comprising a tray and the multi-layer film structure of FIG. 1

FIG. 5 shows a package comprising tray (42) and the multi-layer structure of FIG. 1. The multi-layer film (2) is preferably sealed about the peripheral flange (44) of tray (42) by heat sealing. The composition of the tray (42) and the first sealant layer (12) are preferably substantially similar to one another so that the heat sealing creates a sealing interface (46) between the inner sealant layer (12) and the tray (42) so that a strong seal is created between the inner sealant layer (12) and the tray (42).

Tray (42) may be made of any suitable material, such as an polyethylene (PE), polypropylene (PP), or a laminate which may comprise barrier layers, adhesive layers and other polymer layers.

Figure 6:
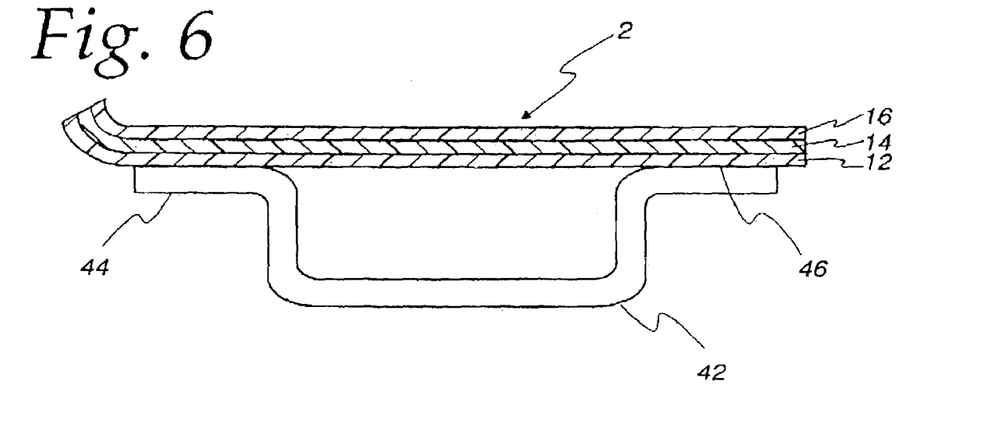
FIG. 6 shows the initial effects on the package of FIG. 5 when pressure is exerted on the multi-layer film of FIG. 1.

FIG. 6 shows the initial effects of a user exerting upward pressure on the end of the multi-layer film (2). As an upward force is directed towards the end of the multi-layer film (2), the first sealant layer (12) remains adhered to the container (42) and the second adjacent layer (14) delaminates from the first sealant layer (12) adjacent the sealing interface (46).

Figure 7:
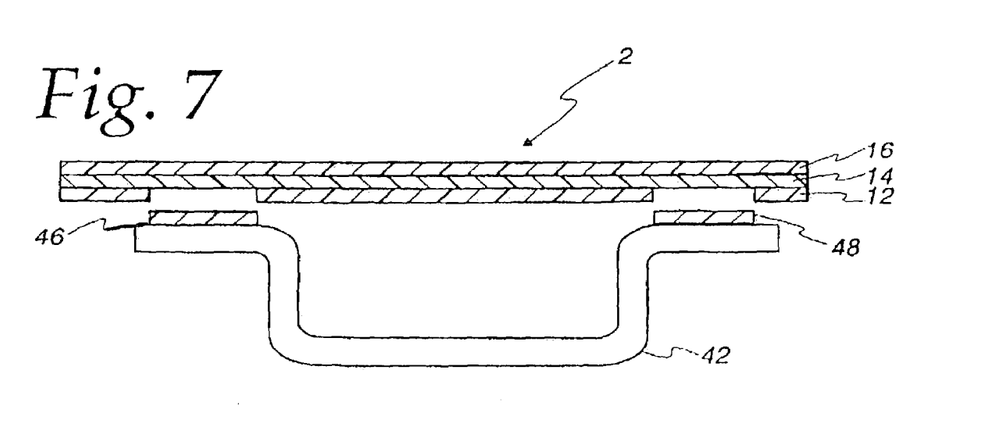
FIG. 7 shows the final results of separation of the sealant film from a packaging component.

FIG. 7 shows the final result of the film structure (2) being peeled from the container. The film remains intact except for a small length of the first sealant layer (48) which remains deposited on the container. The force exerted to pull the end of the film (2) away from the container causes the package to open. Because the strength of the seal between the first sealant layer (12) and container (42) is greater than the adhesion strength between the first sealant layer (12) and the second adjacent layer (14), the film (2) pulls away from the first sealant layer (12) adjacent the sealing interface (46).

The first sealant layer of the present invention can be from any suitable material which adheres well to the tray. However, when the film is to be used in a food package intended for retort application, FDA regulations presently limit components to those materials that meet extraction requirements.

In preferred embodiments, the tray is primarily polypropylene with the optional presence of a pigmented concentrate. The tray may also be a blend of polypropylene and polyethylene with the optional presence of a pigmented concentrate.

In retort applications, a preferred composition for the first sealant layer (12) is predominantly polypropylene, in an amount greater than about 50% by weight based on the total weight of the layer. A preferred range is between about 60% by weight to about 100% by weight; a particularly preferred range is between about 80% by weight to about 100% by weight based on the total weight of the layer. The polypropylene may be present as a homopolymer (PP) or as a copolymer with ethylene (PPE). A particularly preferred polypropylene is exemplified by Hutsman's propylene ethylene copolymer wherein the ethylene copolymer is present in an amount up to about 2.5% by weight based on the total weight of the propylene ethylene copolymer.

In a broader application of the sealant film structures, the first sealant layer may comprise a blend of resins or a single resin wherein said resins are independently selected from the group consisting of polyethylenes (PE), ethylene vinyl acetate copolymer (EVA), polypropylenes (PP), propylene ethylene copolymers (PPE), ethylene normal butyl acrylate copolymer (ENBA), ethylene methyl acrylic acid copolymer (EMAA), ethylene acrylic acid (EAA), ethylene methylacrylate (EMA), and ionomers. These resins, or resin blends, may comprise various percentages of the total weight of the layer. The first sealant layer may also contain processing aids. These processing aids may be added to the layer as individual components during processing or the processing aids may be incorporated within the resin composition for the first sealant layer.

The second adjacent layer of the film structures of the present invention may be any composition which adheres only to a limited extent to the first sealant layer. The second adjacent layer may comprise a resin or a blend of resins wherein the resin is selected from the group consisting of polyethylenes (PE), ethylene vinyl acetate copolymer (EVA), polypropylenes (PP), propylene ethylene copolymers (PPE), ethylene normal butyl acrylate copolymer (ENBA), ethylene methyl acrylic acid copolymer (EMAA), ethylene acrylic acid (EAA), ethylene methylacrylate (EMA), and ionomers.

In retort applications, preferred resins for use in the second adjacent layer are propylenes which are exemplified by polypropylenes (PP) and propylene ethylene copolymers (PPE) and ethylene α-olefins exemplified by Tafmer®.

A preferred range of the polypropylene resin either as a homopolymer or propylene in conjunction with a copolymer such as ethylene is from about 40% by weight to about 95% by weight with a particularly preferred range being from about 60% by weight to about 80% by weight based on the total weight of the layer. A preferred range for the ethylene α-olefin (e.g., Tafmer) is from about 5% by weight to about 60% by weight based on the total weight of the layer. A preferred composition for the second adjacent layer is about 60% by weight propylene ethylene copolymer (PPE) and about 40% by weight of low molecular weight α-olefin (e.g., Tafmer), based on the total weight of the layer. The second adjacent layer may also contain processing aids. These processing aids may be added to the layer as individual components during processing.

The third layer of the film structure of the present invention may comprise a resin or a blend of resins wherein the resins are independently selected from the group consisting of polyethylenes (PE), ethylene vinyl acetate copolymer (EVA), polypropylenes (PP), propylene ethylene copolymers (PPE), ethylene normal butyl acrylate copolymer (ENBA), ethylene methyl acrylic acid copolymer (EMAA), ethylene acrylic acid (EAA), ethylene methylacrylate (EMA), and ionomers.

In retort applications preferred resins for use in the third layer are polypropylenes. The polypropylenes may be present as a homopolymer (PP) or in conjunction with a copolymer such as ethylene (PPE). A particularly preferred resin for use in this layer is propylene ethylene copolymer. A preferred composition for the third layer is about 60 to about 100% by weight of propylene ethylene copolymer manufactured by Basell. A particularly preferred composition for the third layer is about 80% by weight to about 100% by weight of propylene ethylene copolymers manufactured by Basell.

The above described layers may be co-extruded and then laminated to a second film structure or heat sealed to a packaging component; such as a tray; the co-extruded/laminated film structure may also be heat sealed to a packaging component, such as a tray.

While the above discussion has addressed a three layer sealant film structure, other sealant film structures which would include additional layer(s) are also embraced by the present invention. The layer(s) would include but not be limited to a color pigmented layer, adhesive layer, tie layer, barrier layer and an abuse or resistant layer.

Suitable colorants include pigments and dyes, especially those which are incorporated in a color concentrate, i.e. a compounded blend of a resin and generally a high percentage of either pigment or dye. The color concentrate is diluted during coextrusion by mixing the concentrate with the primary resin (i.e., one of the polymers listed above as suitable for the first or/and second layers). Preferably the resin portion of the color concentrate is compatible with the polymeric material selected for use in the first and/or second layers of the film structure. A suitable color concentrate for use in this invention is a white pigment in a polypropylene base manufactured by Chroma Corp. Although in one embodiment, the third polymeric layer is in direct contact with the second adjacent layer, in other embodiments, the second and third layers may be separated by one or more layers. These additional layers may preferably comprise a color concentrate.

In embodiments shown in FIGS. 1 and 2 the coextrusion layers can be laminated to a second film structure which are exemplified in FIGS. 3 and 4. The embodiments shown in FIGS. 1, 2, 3 and 4 can also be heat sealed to a packaging component, such as a tray.

Container or tray (42) may be made of any suitable material, such as polyethylene, very low density polyethylene, polypropylene, ultra low density polyethylene, ethylene vinyl alcohol, ethylene butene copolymer, polyesters such as polyethylene terephthalate or polybutylene terephthalate, ethylene vinyl acetate, propylene ethylene copolymers, MXD6, nylon, high impact polystyrene, metal foil, vinylidene chloride copolymers, inks, primers or ionomers.

In multi-layer sealant film structure film as described herein, a tie, an adhesive, or a barrier component may also be present. Laminates using this invention may include any suitable tie adhesives, or barrier component known in the art. Adhesive materials suitable for use in the present invention may be exemplified by, but not limited to, urethane adhesives which are catalyzed with aliphatic type catalysts, anhydride modified polyolefins, such as graft copolymer of maleic anhydride and ethylene, ethylene acrylic acid copolymers, ethylene methyl acrylate copolymers.

Barrier materials suitable for use in the present invention may be exemplified by, but not limited to, vinylidene chloride methylacrylate copolymer and vinylidene chloride vinyl chloride copolymer, MXD6, nylon 6, nylon 6,6, ethylene vinyl alcohol copolymer, foil and glass coated films (e.g., Toppan GL-AEH).

Abuse or resistant layer materials suitable for use in the present invention may be exemplified by, but not limited to, biaxially oriented nylon or polyethylene terephthalate.

The multi-layer sealant film structures of the present invention may range from about 0.5 mils to about 10.0 mils, with a normal range of about 1.5 mils to about 3 mils, and are preferably about 1.5 mils to about 2.5 mils. The first sealant layer (12) may be of a thickness of about 0.1 mils to about 1.00 mils with a preferable range of about 0.2 mils to about 0.5 mils. The second adjacent layer (14) may be of a thickness of about 0.2 mils to about 1.0 mils with a preferable range of about 0.2 mils to about 0.4 mils.

In preferred embodiments of the film structures of the present invention, the polymer material, which comprises the first layer (sealant layer) of the film structure of FIG. 1, is no greater than about 5 to about 20% by weight of the total thickness of the film structure with about 10% by weight being preferred. The polymeric material, which comprises the second layer of the film structure of FIG. 1, is no greater than about 5 to about 25% by weight of the total thickness of the film structure with about 15% by weight being preferred. The polymeric material which comprises the third layer of the film structure of FIG. 1 is no greater than about 55% by weight to about 90% by weight with about 75% by weight being preferred.

Films of the present invention can be formed by any of the conventional processes for making multi-layer films, including laminations, extrusions, coextrusions, blown extrusion, cast extrusion, tubular water quenched extrusion, extrusion coatings, and the like, and combinations thereof. Coextrusion is presently preferred for forming the multi-layer sealant film structure, of the present invention with lamination being used to add the sealant film structure to a second film structure and heat sealing being used to add the sealant film structure comprising the coextruded film structure/laminated film structure to a packaging component, such as a tray.

The multi-layer sealant film structures of the present invention are particularly applicable to being sealed to a container, such as, for example, a thermoformed tray, by any means known in the art. Appropriate sealing means are heat sealing by either conduction, induction (RF) sealing, impulse resistance wire, ultrasonic, IR or other known heat sealing apparatus.

As an alternative, the films of the present invention can be sealed to another film to form a pouch by forming heat seals or adhesive seals around the periphery of the two films. The second film structure may comprise layers that are not the present invention since it is only necessary that one side of the film delaminate upon opening the package. It is not necessary that the second sheet delaminate.

One example of such a pouch application is to heat seal a film of the present invention to a multi-layer film which can be exemplified by a film comprising layers of PET/adhesive/MA saran/adhesive/PP. The PP layer can be heat sealed to the other sealant layer described herein. These types of packages (pouches) would have utility in sterile applications.

Because one of the goals of this invention is to achieve a peelable multi-layer film which can be peelable with a moderate amount of force, the compositions of the first sealant layer (12) and second adjacent layer (14) are interdependent. For example, if polypropylene is used in the first sealant layer (12), then the second adjacent layer (14) should be a blend of polypropylene and an ethylene α-olefin to control the adhesion between the two layers and also provide for a delamination peel of the desired peel force.

The multi-layer sealant film structures of the present invention in a preferred embodiment provide a lidstock for a retortable package. The multilayer sealant film structures are heat sealed to the tray of the retortable package. The multi-layer sealant film structures also provide packages that will withstand retort processing for one hundred minutes or more at about 275° F. and peel easily from a tray. The multi-layer film structures also provide a package that will withstand high sealing temperatures (300 to 420 F.) and high burst requirements which average 20 to 30 psi. The multi-layer film structures further provide a package that insures the product contained therein has adequate protection from oxygen and moisture transmission.

The following non-limiting examples are given by way of illustration and are not intended to be considered a limitation of this invention.

EXAMPLES

The following multi-layer structures were prepared by coextrusion. As discussed below, some of these coextruded films were laminated to additional film structures.

In the following examples, the letters refer to the following materials:

A. 13M11A is a propylene-ethylene copolymer manufactured by Huntsman Polymers.
B. SR 257M is a propylene ethylene copolymer manufactured by Basell.
C. A-4085 is a ethylene butene-1-copolymer manufactured by Mitsui.
D. P-20192H is a color concentrate in a polypropylene base manufactured by Chroma Corp.
E. Dupont MLBT PET
F. Asahi Barrialon Saran
G. Honeywell 1500M biaxial nylon
H. White, pigmented urethane adhesive
I. Rohm & Haas Adcote 560 A/560 B adhesive
J. Toppan GL-AEH (glass coated film)

Example 1

The film of Example 1 was manufactured by coextrusion of the resins described below. The film of Example 1 may be laminated to a second film structure or heat sealed to a packaging component, such as a tray using the procedures described earlier. The film of Example 1 is as follows:

| | Resin | Film Density (g/cc) | % of Layer Weight | % of Web Caliper | Layer Caliper (mil) |
|---|---|---|---|---|---|
| TOTAL CALIPER 2.00 | | | | | |
| Layer 3 | Layer PPE, Basell Pro-Fax SR-257M | 0.900 | 100.00 | 75.0 | 1.50 |
| | Total | | 100.00 | | |
| Layer 2 | Second Adjacent Layer PPE, Basell Pro-Fax SR-257M, Mitsui Tafmer A-4085, | 0.900 0.885 | 60.00 40.00 | 15.0 | 0.30 |
| | Total | | 100.00 | | |
| Layer 1 | First Sealant Layer PPE, Huntsman Polymers | 0.900 | 100.00 | 10.0 | 0.20 |
| | Total | | 100.00 | | |
| | | | | 100.00 Total Caliper | 2.00 |

Example 2

The film of Example 2 was manufactured by coextrusion of the resin described below. The film of Example 2 may be laminated to a second film structure or heat sealed to a packaging component, such as a tray using the procedures described earlier. The film of Example 2 is as follows.

| | Resin | Film Density (g/cc) | % of Layer Weight | % of Web Caliper | Layer Caliper (mil) |
|---|---|---|---|---|---|
| TOTAL CALIPER 2.00 | | | | | |
| Layer 5 | outside impact PPE, Basell Pro-Fax SR-257M, | 0.900 | 100.00 | 25.0 | 0.50 |
| | Total | | 100.00 | | |

-continued

TOTAL CALIPER 2.00

| Resin | Film Density (g/cc) | % of Layer Weight | % of Web Caliper | Layer Caliper (mil) |
|---|---|---|---|---|
| Layer 4    core | | | 15.0 | 0.30 |
| PPE, Basell Pro-Fax SR-257M, | 0.900 | 84.00 | | |
| Color Conc, Chroma Corp. P-20192H (White), | 1.490 | 16.00 | | |
| Total | | 100.00 | | |
| Layer 3    inside | | | 35.0 | 0.70 |
| PPE, Basell Pro-Fax SR-257M, | 0.900 | 84.00 | | |
| Color Conc, Chroma Corp. P-20192H (White), | 1.490 | 16.00 | | |
| Total | | 100.00 | | |
| Layer 2    inside | | | 15.0 | 0.30 |
| PPE, Basell Pro-Fax SR-257M, | 0.900 | 60.00 | | |
| Other Mitsui Tafmer A-4085 | 0.885 | 40.00 | | |
| Total | | 100.00 | | |
| Layer 1    sealant | | | 10.0 | 0.20 |
| PPE Huntsman Polymers | 0.900 | 100.00 | | |
| Total | | 100.00 | | |
| | | | 100.00  Total Caliper | 2.00 |

Example 3

The multi-layer sealant film structure of Example 1 was laminated to a second film structure to give the film structure represented below:

PET/adhesive/vinylidene chloride methylacrylate/adhesive/biaxial nylon/adhesive/Film of Ex. 1
(E)   (I)              (F)                  (I)           (G)         (I)

wherein the letter in (parentheses) designates a preferred embodiment of the component.

Example 4

The multi-layer sealant film structure of Example 2 was laminated to a second film structure to give the film structure represented below.

PET/wh. adhesive/vinylidene chloride methylacrylate/adhesive/biaxial nylon/adhesive/Film of Ex. 2
(E)     (H)               (F)                  (I)           (G)         (I)

wherein the letter in (parentheses) designates a preferred embodiment of the component.

Example 5

The multi-layer sealant film of Ex. 1 was laminated to a second film structure to give the film structure represented below.

PET/adhesive/glass coated film/adhesive/biaxial nylon/adhesive/Film of Ex. 1
(E)    (I)          (J)            (I)         (G)         (I)

wherein the letter in (parentheses) designates a preferred embodiment of the component.

Example 6

The multi-layer sealant film of Ex. 2 is laminated to a second film structure to give the film structure represented below.

PET/wh. adhesive/glass coated film/adhesive/biaxial nylon/adhesive/Film of Ex. 2
(E)   (H)   (J)   (I)   (G)   (I)

wherein the letter in (parentheses) designates a preferred embodiment of the component.

I claim:

1. A package comprising a tray and a sealant film comprising a first sealant layer and a second adjacent layer wherein said second adjacent layer is in direct contact with said first sealant layer and wherein the first sealant layer comprises a polymer or polymer blend wherein the polymer is independently selected from the group consisting of polyethylenes (PE), ethylene vinyl acetate copolymer (EVA), polypropylenes (PP), propylene ethylene copolymers (PPE), ethylene normal butyl acrylate copolymer (ENBA), ethylene methyl acrylic acid copolymer (EMAA), ethylene acrylic acid (EAA) and ethylene methylacrylate (EMA) and the second adjacent layer comprises a blend of the same polymer or polymer blend as is present in the first sealant layer and ethylene-butene-1-copolymer, and wherein delamination occurs between the first sealant layer and the second adjacent layer.

2. The package of claim 1 wherein the second adjacent layer of the sealant film comprises a blend of two or more polymers wherein the polymers are independently selected from the group consisting of polyethylenes (PE), ethylene vinyl acetate copolymer (EVA), polypropylenes (PP), propylene ethylene copolymers (PPE), ethylene normal butyl acrylate copolymer (ENBA), ethylene methyl acrylic acid copolymer (EMAA), ethylene acrylic acid (EAA), and ethylene methyl acrylate (EMA).

* * * * *